United States Patent [19]

Arvedson et al.

[11] Patent Number: 5,538,790
[45] Date of Patent: Jul. 23, 1996

[54] CLING FILM

[75] Inventors: Marsha M. Arvedson, Houston; Patrick Brant, Seabrook; Paul M. German, Friendswood, all of Tex.; John E. Wydila, Chicago, Ill.

[73] Assignee: Exxon Chemical Patents Inc., Linden, N.J.

[21] Appl. No.: 169,085

[22] Filed: Dec. 17, 1993

[51] Int. Cl.$^6$ .................................................. B32B 7/12
[52] U.S. Cl. .......................... 428/349; 428/349; 428/500; 428/516; 428/910; 264/176.1
[58] Field of Search ........................ 428/910, 34.9, 428/349, 500; 264/176.1; 526/348.6, 352.2

[56] References Cited

U.S. PATENT DOCUMENTS

| | | | |
|---|---|---|---|
| 4,671,987 | 6/1987 | Knott, II et al. | 428/216 |
| 4,996,094 | 2/1991 | Dutt . | |
| 5,059,481 | 10/1991 | Lustig et al. | 428/34.9 |
| 5,093,185 | 3/1992 | Ungar et al. . | |
| 5,114,763 | 5/1992 | Brant et al. . | |
| 5,175,049 | 12/1992 | Huff et al. . | |
| 5,212,001 | 5/1993 | Brant et al. | 428/34.9 |
| 5,234,731 | 8/1993 | Ferguso | 428/34.9 |
| 5,248,547 | 9/1993 | Wilson | 428/218 |
| 5,273,809 | 12/1993 | Simmons . | |

FOREIGN PATENT DOCUMENTS

| | | |
|---|---|---|
| 0287272 | 10/1988 | European Pat. Off. . |
| 0341091 | 11/1989 | European Pat. Off. . |
| 91/17944 | 11/1991 | WIPO . |
| 93/03093 | 2/1993 | WIPO . |
| 93/13143 | 7/1993 | WIPO . |
| 94/26816 | 11/1994 | WIPO . |

OTHER PUBLICATIONS

Thomas C. Yu and George J. Wagner, "Polyolefin Modification with EXACT™ Plastomers", Exxon Chemical Company, Houston, TX, Feb. 1992.

Bamberger et al., USSN 08/061,929, "Ethylene Copolymers Having Narrow Composition Distribution, Their Production And Use", Filed with USPTO May 13, 1993.

Primary Examiner—Edith Buffalow
Attorney, Agent, or Firm—M. Susan Spiering; Frank E. Reid

[57] ABSTRACT

A method to produce a stretch cling film possessing cling without added tackifier or acrylate unit is disclosed. Preferred copolymers to make this film have a solubility distribution breadth index of less than about 35° C. and are ethylene/$C_{3-20}$ alpha olefin copolymers with greater than about 4 to about 20 mole percent comonomer content.

33 Claims, No Drawings

5,538,790

CLING FILM

FIELD OF THE INVENTION

This invention relates to films and more particularly to non-acrylate stretch cling films essentially free of added tackifier having properties suited for use as cling wraps or in multilayer films.

BACKGROUND

Stretch/cling films have wide application, including bundling packaged food and other goods. One application of particular interest is in the bundling of goods for shipping and storage, for example, the bundling of large rolls of carpet, fabric, or the like. A particularly important bundling application is the containment and unitizing of pallet loads.

Because the film can be under considerable tension in a stretched condition, it has a tendency to return to its original, unstretched state. This tension can cause the film to unravel from the wrapped pallet, thereby jeopardizing the integrity of the unitized load. A film having cling properties to prevent unraveling of the film from the pallet is therefore desirable.

To impart cling properties or improve the cling properties of a particular film, a number of techniques have been employed, such as the addition of tackifying additives or use of acrylates in the (co)polymer. Common tackifying additives include polybutenes, terpene resins, alkali metal and glycerol stearates and oleates and hydrogenated rosins and rosin esters.

The use of tackifiers has disadvantages. While tackification is known in the art to enhance cling in an olefin cling film, stretching the film normally reduces the cling properties. The tackifier may also present blending difficulties during film manufacture, adversely affect optical properties of the film and enhance surface migration of the additive. Such migration can damage the wrapped goods and cause the collapse and/or telescoping of the rolls. The use of compatible tackifiers has been described as a method to minimize the adverse effects such as degraded optical properties and migration in films.

Multilayer films offer the advantage of imparting several properties not easily obtained from a single layer. See U.S. Pat. Nos. 4,518,654 and 5,114,763 incorporated by reference. With a multilayer film, a stretch/cling wrap can have cling properties on one side and, for example, slip properties on the other.

Many of the multilayer films, however, suffer from the shortcomings of their individual layers. For instance, films containing a tackifying additive may be prepared and used in such a manner that the tackifier is "picked off" and onto the slip side of the film because the slip and cling layers of the film are in intimate contact on the film roll. Others do not possess desired slip properties, particularly when in a highly stretched state. Still others do not possess a desirable combination of stretch, tensile, tear-resistance, puncture-resistance, optical, and thermal stability properties.

Prior art cling films have typically contained either tackifier, as discussed above, and/or acrylate/acrylic monomer to impart the desired cling performance. It is desirable to have a film having cling properties without the adverse effects detailed above.

EP 0 287 272 and U.S. Pat. No. 5,248,547, assigned to Mobile Corporation, describe stretch wrap made from linear low density polyethylene (LLDPE) copolymers having a density of about 0.905 to about 0.940 gm/cm$^3$ and a melt index (MI) of about 1 to about 10 dg/min, further containing from 4 to 10 weight percent of n-hexane extractables. These stretch wraps, in the absence of cling agents, reportedly, have inherent cling. The cling is disclosed as dependent on density and possibly also n-hexane extractables. EP 287 272 exemplifies Exxon LL3003.55 LLDPE (ethylene-hexene-1copolymer) containing approximately 6 weight percent n-hexane extractables possessing a cling force of 212 grams/ inch (about 538 g/cm). The films as described by Mobil generally possess low molecular weight fractions which can impart undesirable characteristics such as difficulty in processing the copolymer into a film.

SUMMARY

The present invention describes a method to produce a film having cling in the stretched state, said method comprising the steps of a) selecting at least one copolymer of ethylene and greater than about 4 mole % non-acrylate comonomer, said copolymer substantially free of added tackifier, having a density in the range of about 0.860 to about 0.904 g/cm$^3$, a solubility distribution breadth index (SDBI) in the range of about 10° to about 35° C., a storage modulus in the range of about $2 \times 10^6$ to about $2 \times 10^7$ dyne/cm$^2$; and b) converting the copolymer into a film. Generally, commercially interesting films possess a cling force of at least about 80 grams/inch (about 203 g/cm), and more preferably greater than about 90 to 100 g/in (228–254 g/cm) when the film is stretched to about 200%. This generally occurs at about or greater than 9 mole percent comonomer content. However, in some applications films with lesser cling may be desirable.

In a preferred embodiment films are made from copolymers comprising ethylene and a non-acrylate comonomer, preferably an alpha olefin having between about 3 and 20 carbon atoms, absent added tackifier, having a molecular weight distribution (MWD) of about 7 or less, a solubility distribution breadth index (SDBI) of less than 20° C., alpha olefin comonomer in the range of about 4 to about 20 mole %, and a storage modulus in the range of about $2 \times 10^6$ to about $2 \times 10^7$ dyne/cm$^2$.

Preferred films formed from these copolymers generally have a cling force of at least about 80 grams/inch (about 203 g/cm) at 200% stretch, prior to the addition of any tackifier.

Preferred films also generally have a density in the range of about 0.860 to about 0.904 g/cm$^3$, preferably less than about 0.904 g/cm$^3$, a MWD of less than about 7, and a melt index (MI) in the range of about 0.1–15 dg/min.

Preferred cling films described are generally suitable for use in multilayer structures wherein additional layers impart other (e.g. non-cling) properties, such as, slip, tear- and puncture-resistance, optical stability, and thermal stability.

In addition to the copolymers and films described above, there is also described herein (1) an embodiment for bundling, packaging, or unitizing an article or a plurality of articles, comprising wrapping the film described above around an article or plurality of articles, and (2) a method for the surface protection of an article comprising covering the surface to be protected with the film described.

Articles of manufacture may be formed from the copolymers described herein, or blends thereof, as well as the cling films described.

DETAILED DESCRIPTION OF THE INVENTION

A method to produce a film having cling in the stretched state, said method comprising the steps of a) selecting at least one copolymer of ethylene and greater than about 4 mole % non-acrylate comonomer, said copolymer substantially free of added tackifier, having a density in the range of about 0.860 to about 0.904 g/cm$^3$, a solubility distribution breadth index (SDBI) in the range of about 10° to about 35° C., a storage modulus in the range of about 2×10$^6$ to about 2×10$^7$ dyne/cm$^2$; and b) convening the copolymer into a film.

This invention relates to a method of selecting resins or copolymers for conversion into films having cling properties in the absence of acrylate units or added tackifiers. One can precalculate the cling values in accordance with equation (1).

$$\text{Cling(grams/inch)} = 17.6 \times (\text{mol \% comonomer}) - 7.9.5 \qquad \text{Eqn. (1)}$$

This equation is valid for polyethylene polymers having a comonomer content in the range of about 4 to about 20 mole percent. Those of skill in the art will appreciate that the coefficient of variation for cling increases as cling approaches zero in a film. Overall cling performance will vary based on the percentage of comonomer content. Conditions applied to the formula include (1) a storage modulus in the range of about 2×10$^6$ to about 2×10$^7$ dyne/cm$^2$, (2) a sufficient amount of comonomer incorporated in polyethylene, generally between about 4 and about 20 mole % comonomer, to impart the desired modulus and (3) a solubility distribution breadth index of less than about 35° C., generally in the range of about 10° to about 35° C., preferably in the range of about 10° to about 25° C. In addition to the conditions applied to the formula, other factors that may affect cling include the type of comonomer incorporated, the thickness of the film measured, the stretch, load, and force applied on the film, and extractables content of the copolymer and resulting film.

For purposes of this invention, the present specification and the appended claims, tackifiers are defined herein as substances which provide sticky or adhesive qualities to copolymers, surfaces, films, or articles. Compressor oils and processing stabilizers such as antioxidants, UV stabilizers, antiblock agents and the like are excluded from this definition. Compatible tackifiers are defined as those substances which are miscible, or form homogeneous blends with the polyethylene on a molecular scale at conditions of fabrication and use. A wide variety of tackifiers are known in the art and include, for example, polybutenes, polyisobutylenes, atactic polypropylenes, terpene resins, aliphatic and aromatic hydrocarbon resins, alkali metal and glycerol stearates, hydrogenated rosins, and the like. For more details on tackifiers, see U.S. Pat. Nos. 5,114,763, 5,154,981, 5,173, 343, and, 5,175,049. Notwithstanding this definition of tackifiers, an object of this invention is to provide a means of generally obtaining and precalculating cling in a film of an ethylene non-acrylate copolymer essentially free of added tackifier.

Preferred Copolymers

In a preferred embodiment, the copolymers comprise ethylene and a non-acrylate monomer, generally an alpha olefin having between about 3 and 20 carbon atoms, preferably 4–12 carbon atoms, most preferably 4–8 carbon atoms. It is expected that ethylene copolymers containing larger alpha olefins (e.g., $C_{10-18}$) can achieve substantial cling (greater than 80 g/in) at lower comonomer contents relative to alpha olefins of less than $C_{10}$. It is believed that due to the larger branches introduced with comonomers of greater than $C_{10}$, substantial cling might be achieved for films made from narrow composition distribution, narrow molecular weight distribution copolymers.

The preferred copolymers of this invention have a molecular weight distribution (MWD) of about or less than 7, preferably less than about 4, most preferably less than about 3, a solubility distribution breadth index (SDBI) of less than about 35° C., generally in the range of about 10° to about 25° C., preferably in the range of about 15° to about 20° C., and most preferably in the range of about 15° to about 18° C.

In film applications, copolymers having a MWD of 4 or less are preferred. Copolymers having MWDs greater than 4 are preferred for embodiments such as moldings.

Preferred copolymers typically have a crystalline melting point ($T_m$) between about 55°–100° C., preferably about 60°–80° C., most preferably about 65°–75° C. and MI values between about 0.1 to about 15, preferably about 1 to about 7, most preferably about 2 to about 5, most, most preferably about 3 to about 4 dg/min (in accordance with ASTM D-1238, Condition E).

In further embodiments the copolymers have a density typically less than about 0.904, generally in the range of about 0.860 to about or less than 0.904, preferably about 0.875 to about 0.895, and most preferably about 0.880 to about 0.890 g/cm$^3$.

In preferred embodiments, comonomers are present at greater than 4 mole %, preferably in the range of about 9 to about 20%, most preferably in the range of about 9–12 mole %. Comonomers may be linear, branched, or cyclic hydrocarbyls, preferably linear or branched alpha olefin monomers. Representative comonomers include, but are not limited to ethylene, 1-butene, 1-pentene, 1-hexene, 4-methylpentene-1,1-octene, 1-decene, 1-dodecene, and the like. Multiply branched olefins such as 3,5,5 trimethylhexene-1 may also be employed. For the purposes of this invention, the olefins 1-butene, 1-hexene, and 1-octene are particularly preferred comonomers.

The molecular weight distribution (MWD) of the copolymers may be narrow or broad and its selection is dependent upon the properties desired for the end-use application. For films, MWD may be less than 7, preferably in the range of about 2 to about 4 and most preferably in the range of about 2 to about 3.

The copolymers may be produced by various processes including but not limited to gas phase, high pressure, solution, bulk, and slurry polymerization techniques. The copolymers are preferably prepared from coordination type catalysts. However, this type of catalyst is not critical provided the copolymers meet the conditions specified above. For purposes of this invention, coordination type catalysts of the type described in EPA 129368, U.S. Pat. No. 5,017,714, and the like are preferred.

Preferred copolymer of the films of the present invention may contain, if desired, non-migratory, compatible (i.e. those which will not be detrimental to the film or properties sought) or homogeneous additives which may be incorporated during the production of the polyolefin or subsequently blended to improve properties of the film. Although not the intent of the invention, these additives, may act as tackifiers.

Solubility Distribution Breadth Index (SDBI)

SDBI is a means to measure the distribution of comonomer within a copolymer having components of varying molecular weights and MWDs. See PCT published application, WO 93/03093, herein incorporated by reference, for an explanation and method of determining SDBI.

It is desirable for the copolymers of the present invention to have a SDBI of less than about 35° C., generally in the range of about 10° to about 25° C., preferably in the range of about 15° to about 20° C., and most preferably in the range of about 15° to about 18° C.

Cling Film

Preferred cling films of ethylene copolymers, essentially free of any added tackifier, have a cling force in the stretched state. "Absent essentially any added tackifier" or "essentially free of tackifier" is defined as being about or less than 1 weight % tackifier, preferably less than about 0.1 weight % tackifier present in the copolymers employed for the cling layer. "Added tackifier" is tackifier purposely added to the film. "Essentially free of added tackifier", "absent any added tackifier" or like phrases regarding the absence of tackifier are intended to be interchangeable. Preferred embodiments are intended to illustrate that cling is present without tackifing agents purposely added to the polymer or polymer blend. Percent tackifier can be measured by standard techniques such as gas phase chromotography (GPC) or GPC-FTIR.

"Stretched state" is defined as a film being about or greater than 50% stretched, preferably greater than about 100% and most preferably about or greater than 200% stretched.

Those skilled in the art understand that the properties of the copolymers may not necessarily transfer over to the cling layer formed therefrom. For example, orientation of the film may impart properties different from that measured in the copolymer. For purposes of this invention, the values of MWD, density, percent comonomer content, SDBI, and percent crystallinity defined for the copolymer are also desired and most preferred for the cling film described.

Preferably the cling films have a ratio of loss to storage modulus of $2 \times 10^6$ to $2 \times 10^7$ dyne/cm$^2$, preferably $5 \times 10^6$ to $2 \times 10^7$ dyne/cm$^2$. when measured at 1 Hz, at room temperature. These films have a crystallinity of about 10% to about 20%, preferably about 12% to about 17%. The films have good optical, oxygen permeability, and blocking characteristics.

Typical extractables for copolymers may range from about 0.1 to about 20 weight percent or greater. Preferably, extractables, including n-hexane (or low molecular weight fraction) extractables, are maintained at low concentrations, such as less than about 4 weight percent. Low extractables content can be particularly valuable in film applications. Those of skill in the art will appreciate that extractables are determined, in part, on the catalyst employed and processing conditions or film fabrication conditions used for the polymers desired. Coordination-catalyzed copolymers used to produce the cling films described herein generally have n-hexane extractables of less than about 20 weight percent when measured in accordance with 21 CFR 177.1520 (d)(3)(ii). The extractables level is measured by exposing film produced from the copolymers to n-hexane at 50° C. Variations in extractables data may be attributed to film thickness (4 mils maximum) or any other variable that changes the surface to volume ratio.

Preferred films of the invention may be single- or multiple-layer films. The latter films may consist of one or more layers formed from ethylene copolymers and blends thereof. The films may also have one or more additional layers formed from other polymers such as polypropylene, polyester and EVOH for instance, metal foils, paper and the like, or HDPE, LLDPE, EVA, HP-LDPE.

Films may be formed by any number of well known extrusion or coextrusion techniques. For example, any of the blown or chill roll techniques are suitable. As an embodiment of the invention, the copolymers may be extruded in a molten state through a flat die and then cooled. Alternatively, the copolymers may be extruded in a molten state through an annular die and then blown and cooled to form a tubular film. The tubular film may be axially slit and unfolded to form a flat film. The films of the invention may be unoriented, uniaxially oriented or biaxially oriented. Physical properties of the film may vary from those of the copolymers depending on the film forming techniques employed. Generally, the properties outlined for the copolymers are what is desired for the cling film of the present invention.

Multiple-layer films may be formed by methods well known in the art. If all layers are copolymers, the copolymers may be coextruded through a coextrusion feedblock and die assembly to yield a film with two or more layers adhered together but differing in composition. Multiple-layer films may also be formed by extrusion coating whereby a substrate material is contacted with the hot molten polymer as the polymer exits the die. For instance, an already formed polypropylene film may be extrusion coated with an ethylene copolymer film as the latter is extruded through the die. Multiple-layer films may also be formed by combining two or more single layer films prepared as described above. The total thickness of multilayer films may vary based upon the application desired. A total film thickness of about 0.4 to about 2.5 mils (about 10–63 microns), preferably from about 0.8 to about 2.0 mils (about 20–50 microns) is suitable for most applications. Those of skill in the art will appreciate that the thickness of individual layers for multilayer films may be adjusted based on desired end use performance, resin or copolymer employed, equipment capability and other like factors.

There are many potential applications of films produced from the present copolymers. These films can be made into other forms, such as tape, by any one of a number of well known cutting, slitting, and/or rewinding techniques. They may be useful as stretch, sealing, or oriented films.

Typical articles suitable for bundling, packaging and unitizing include various foodstuffs (canned or frozen), rolls of carpet, liquid containers and various like goods normally containerized and/or palletized for shipping, storage, and/or display.

The films may also be used in surface protection applications with or without stretching. The films are effective, especially in the temporary protection, of surfaces during manufacturing, transportation, etc.

The surfaces of the film of this invention can be modified by such known and conventional post-forming techniques such as corona discharge, chemical treatment, flame treatment, and the like.

Cling Force Determination

Cling is reported as the force in grams/inch (or g/cm) required to partially peel apart two strips of film. A first film strip is attached to a 30 degree inclined plane with the outside surface (slip) facing upward. A second 1"×8"(2.5cm×20 cm) strip is placed on top of the first strip with the inside surface (cling) facing downward. Pressure is applied to the second strip to cause the two strips to stick together. The films are prestretched to a desired percentage (e.g., 0%, 100%, 200%) and allowed to relax before testing. The end of the second strip at the base of the inclined plane is attached, by clip and string, to an apparatus which can exert a strain at a constant rate (Instron 1130). The two strips are then pulled apart at a crosshead speed of 10 cm/min until the aforementioned string is parallel with the base of the inclined plane. The force at this point is reported as cling.

The invention is illustrated by the following non-limiting examples and tables.

EXAMPLES

Examples 1–3

Three different ethylene copolymers were co-extruded with polypropylene in a 20/80 proportion on a Killion line extruder.

Table 1 reports the cling measurements and property data for cling films, without added tackifiers, produced on a Killion line wherein the film composition was 80% PP-3014 (polypropylene) obtained from Exxon Chemical Company (MFR 12 dg/min.-ASTM D1238) and 20% cling layer polymer. Three cling layer ethylene/hexene copolymers were investigated having the following composition: (Example 1) Exact™ 3001C having about 15 weight % hexene-1 comonomer content, (Example 2) copolymer polymerized by high pressure process containing about 17 weight % hexene-1 comonomer content, (Example 3) Exact™ 4008 having about 25 weight % hexene-1 comonomer content. The formulations of examples 1 and 3 are available from Exxon Chemical Company, Baytown, Tex.

Example 4

An ethylene/butene copolymer was co-extruded with polypropylene copolymer as a slip layer and polyethylene copolymer as a core layer.

Table 2 reports the cling data for Example 4, an ethylene/butene copolymer, without added tackifiers, produced by high pressure polymerization used as the cling layer film wherein the cling layer copolymer had a density of 0.8807 g/cc, about 25 weight % butene, MP of about 58° C., a storage modulus of about $9 \times 10^6$ (1 Hz, room temperature) and a weight average MW of about 79,000. The polyethylene core layer of the film tested comprised LL3003. (LL= linear low), the slip layer comprised PP4062. LL3003 and PP4062 are available from Exxon Chemical Company.

The film of Example 4 was produced by coextruding the PE (polyethylene) copolymer and PP on a Killion cast film line with two ¾" (1.9 cm) extruders, respectively for the PE and PP layers. The chill roll temperature was set to 76 and the line speed to 41 feet/minute.

Experiments were conducted with films of polyethylene having (1) 24 weight percent (9.3 mole percent) and (2) 28 weight percent (11.3 mole percent) methylacylate comonomer content respectively. No tackifier was added. These films were found to have cling values between 80–100 g/in ( about 203–254 g/cm). These methylacylate comonomer film comparisons illustrate that the non-acrylate comonomer films of the present invention, having comparable mole percent incorporation, have cling properties without the need for added tackifiers or acrylic units to impart cling to the film.

The films of the examples had a gauge of about 1.3 mils (about 33 microns) with the PP layer comprising about 80% of the total thickness.

It should be understood that modifications and variations besides those specifically mentioned and exemplified may be made in the compositions and films described herein without substantially departing from the concept of the present invention. The form of the invention described herein is exemplary only and is not intended as a limitation of the scope thereof.

TABLE 1

Cling Measurements for Experimental Killion Line Cling Films film composition: 80% PP3014, 20% cling layer polymer. cling measured at 200% elongation (grams/inch)

| cling layer | Wt % $C_6$ | mole % | MW $10^3$ (g/m) | density (g/cc) | MP (°C.) | cling (g/in) |
|---|---|---|---|---|---|---|
| Ex. 1 | 15.6 | 5.8 | 72.9 | .9012 | 96.5 | 37.2 |
| Ex. 2 | 17.5 | 6.6 | 79.9 | .8999 | — | 34.6 |
| Ex. 3 | 24.6 | 9.8 | 71.3 | .8851 | 75.9 | 84.1 |

TABLE 2

Example 4
Cling Data for Experimental Killion Cling Film
core layer = LL3003, slip layer = PP4062
cling layer = ethylene/butene copolymer:
density = .8807, wt % butene = 25, mole % butene = 14.7%,
MP = 58° C., MW = 79K

| 0% stretch | 100% stretch | 200% stretch |
|---|---|---|
| 270 g/in | 200 g/in | 180 g/in |

We claim:

1. A method to produce a film having cling in the stretched state, said method comprising:
   a. selecting at least one copolymer consisting essentially of ethylene and at least one olefin having between 3 and about 20 carbon atoms, said olefin present at greater that about 4 mole percent, said copolymer substantially free of added tackifer, having a density in the range of about 0.860 to about 0.904 g/cm³, a solubility distribution breadth index (SDBI) in the range of about 10° to about 25° C., a MI in the range of about 0.1 to about 15 dg/min.; and
   b. converting the copolymer into the film.

2. The method of claim 1 wherein the stretched state is about or greater than 50%.

3. The method of claim 1 wherein the stretched state is about or greater than 100%.

4. The method of claim 1 wherein the stretched state is about or greater than 200%.

5. The method of claim 1 wherein the olefin is present at about 9 to about 20 mole percent.

6. The method of claim 5 wherein the olefin is present at about 9 to about 12 mole percent.

7. The method of claim 1 wherein the film has a cling force of about or greater than 80 g/in at 200% stretch.

8. The method of claim 1 wherein the copolymer has a density in the range of about 0.875 to about 0.895 g/cm³.

9. The method of claim 8 wherein the copolymer has a density in the range of about 0.880 to about 0.890 g/cm³.

10. The method of claim 1 wherein the copolymer has a SDBI in the range of about 15° to about 20° C.

11. The method of claim 1 wherein the copolymer has a molecular weight distribution of less than about 7.

12. The method of claim 11 wherein the copolymer has a molecular weight distribution in the range of about 2 to about 4.

13. The method of claim 12 wherein the copolymer has a molecular weight distribution in the range of about 2 to about 3.

14. The method of claim 1 wherein the copolymer has a MI in the range of about 1 to about 7 dg/min.

15. The method of claim 14 wherein the copolymer has a MI in the range of about 3 to about 4.

16. A film produced by the method of claim 1 comprising at least one layer having at least one copolymer consisting essentially of ethylene and at least one olefin having between 3 and about 20 carbon atoms, said olefin present at greater than about 4 mole percent, said copolymer substantially free of added tackifier, having a density in the range of about 0.860 to about 0.904 g/cm$^3$, a SDBI in the range of about 10° to about 25° C. and a MI in the range of about 0.1 to about 15 dg/min., said layer having cling in the stretched state.

17. The film of claim 16 wherein the stretched state is about or greater than 50%.

18. The film of claim 17 wherein the stretched state is about or greater than 100%.

19. The film of claim 18 wherein the stretched state is about or greater than 200%.

20. The film of claim 16 wherein the olefin is present in the film at about 4 to about 20 mole percent.

21. The film of claim 20 wherein the olefin is present in the film at about 9 to about 20 mole percent.

22. The film of claim 21 wherein the olefin is present in the film at about 9 to about 12 mole percent.

23. The film of claim 22 having a cling force of about or greater than 80 g/in at 200% stretch.

24. A method for bundling, packaging, or unitizing an article or a plurality of articles, comprising: wrapping the film of claim 16 around the article or plurality of articles.

25. A method for the surface protection of an article comprising covering the surface to be protected on the article with the film of claim 16.

26. A stretch cling film comprising at least one layer comprising a copolymer having a solubility distribution breadth index (SDBI) in the range of about 10° to about 25° C., said copolymer consisting essentially of ethylene and at least one other olefin having between 3 and about 20 carbon atoms, said olefin present in greater than about 4 mole %.

27. The film of claim 26 having a cling force of at least about 30 g/in at 200% stretch.

28. The film of claim 27 having a cling force of about 80 g/in or in greater at 200% stretch.

29. The film of claim 28 having a cling force of about 180 g/in or greater at 200% stretch.

30. The film of claim 26 wherein the olefin is present at about 6 to about 15 mole percent.

31. The film of claim 26 wherein the olefin is present at about 9 to about 20 mole percent.

32. The film of claim 26 wherein the olefin present has between 4 and about 12 carbon atoms.

33. The film of claim 32 wherein the olefin present has between 4 and about 8 carbon atoms.

* * * * *

UNITED STATES PATENT AND TRADEMARK OFFICE
CERTIFICATE OF CORRECTION

PATENT NO. : 5,538,790
DATED : July 23, 1996
INVENTOR(S) : Arvedson, et al

It is certified that error appears in the above-indentified patent and that said Letters Patent is hereby corrected as shown below:

At Col. 3, line 9 for the word "convening" substitute the word "converting".

At Col. 3, line 16, for the text "Cling(grams/inch)=17.6x(mol % comonomer)-7.9.5" substitute "Cling (grams/inch) = 17.6 x (mol % comonomer) - 79.5".

At Col. 5, line 32, delete the text "ratio of loss to".

At Col. 6, line 53, for the text "to a 30 degree inclined plane" substitute "to a 20 degree inclined plane".

At Col. 7, line 44, for the text "temperature was set to 76 and" substitute "temperature was set to 76°F and".

Signed and Sealed this

Twenty-ninth Day of April, 1997

*Attest:*

BRUCE LEHMAN

*Attesting Officer*    Commissioner of Patents and Trademarks